Figure 1:
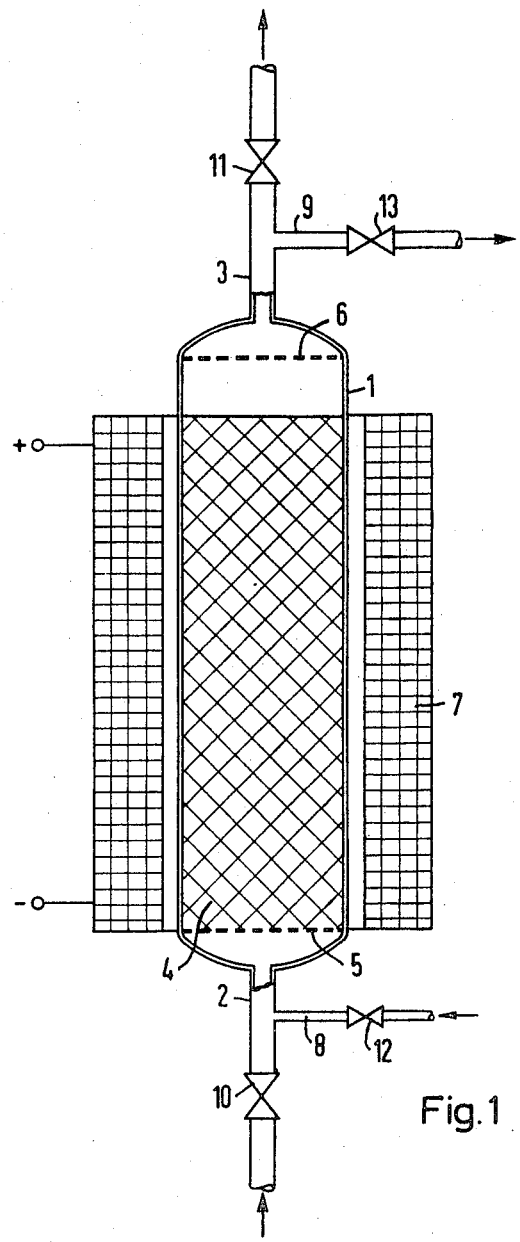

United States Patent
Heitmann et al.

[11] 3,841,486
[45] Oct. 15, 1974

[54] DEVICE FOR PURIFYING THE FEED WATER OF A STEAM POWER INSTALLATION

[75] Inventors: Hans-Günter Heitmann, Erlangen-Buckenhof; Gerhard Donath; Werner Beyer, both of Erlangen, all of Germany

[73] Assignee: Siemens Aktiengesellschaft, Munchen and Berlin, Germany

[22] Filed: Dec. 28, 1971

[21] Appl. No.: 213,207

Related U.S. Application Data

[63] Continuation-in-part of Ser. No. 887,574, Dec. 23, 1969, abandoned.

[30] Foreign Application Priority Data
Dec. 24, 1968  Germany.......................... 1816859

[52] U.S. Cl................. 210/108, 210/167, 210/194, 210/222, 210/416
[51] Int. Cl....................... B01d 23/24, B01d 35/06
[58] Field of Search............ 210/108, 42, 222, 223, 210/416, 167, 194; 209/224; 335/216, 296, 297; 317/155.5

[56] References Cited
UNITED STATES PATENTS

| | | | |
|---|---|---|---|
| 1,491,600 | 4/1924 | Fernow, Jr...................... | 209/224 X |
| 1,948,419 | 2/1934 | Granigg............................. | 210/222 |
| 2,430,157 | 11/1947 | Byrd, Jr. ............................ | 210/222 |
| 2,451,073 | 10/1948 | Cowherd............................ | 210/108 |
| 2,452,220 | 10/1948 | Bower............................... | 210/222 |
| 2,607,492 | 8/1952 | Anders.............................. | 210/222 |
| 3,535,597 | 10/1970 | Kendrick ......................... | 317/155.5 |
| 3,539,509 | 11/1970 | Heitmann et al. .................... | 210/42 |
| 3,567,026 | 3/1971 | Kolm ............................... | 210/222 |

FOREIGN PATENTS OR APPLICATIONS
6,716,237   5/1968   Netherlands........................ 210/222

*Primary Examiner*—Theodore A. Granger
*Attorney, Agent, or Firm*—Herbert L. Lerner

[57] ABSTRACT

An electromagnetic filter for separating iron oxides from the feed water of a steam power plant. The filter comprises a cylindrical tubular filter containing steel ferromagnetic particles and an electric coil for producing a magnetic field. The field intensity is considerably about the saturation field intensity of the magnetizable particles.

1 Claim, 3 Drawing Figures

DEVICE FOR PURIFYING THE FEED WATER OF A STEAM POWER INSTALLATION

This is a continuation-in-part of application Ser. No. 887,574 filed Dec. 23, 1969, now abandoned.

In steam power installations, where the installation parts and pipe lines are predominantly comprised of ferrite steels, the water used therein always shows traces of iron oxides. These iron oxides are essentially comprised of ferromagnetic $Fe_3O_4$, or of $\gamma$-$Fe_2O_3$. In steam generators and steam turbines, these oxides may lead to localized deposits and cause operational disturbances. The removal of these iron oxides from the machinery material is therefore of great technical and economical importance.

Permanent magnet filters have been employed for removing the iron oxides from condensates. In these filters, the permanent magnets are arranged with respectively opposite poles, and are traversed by the water. The difficult cleaning of the magnets is a shortcoming since the magnets must be pulled out and cleaned by hand. A device is also known, wherein, the magnets are attached in various planes, crossing upon a shaft. By rotating the shaft, driven by a rotor, the precipitated magnetic particles can be expelled and removed by simultaneous rinsing. Since the particles precipitaed here are only of a grain size above 30 $\mu$, this device serves primarily as a protection for ion exchangers of a condensate sludge installation and for reducing the total pressure loss of the same.

Also known is a filter installation where a filter bed surrounded by an electrical coil is filled with steel pins, so designed that sharp edges and points occur at the particles with magnetic properties, in order to facilitate a better deposit of the particles to be removed. The remanence of these steel pins makes the rinsing away of the deposited particles impossible. Thus following saturation of the filter bed, all the pins must be removed from the filter bed and replaced by new ones.

Contrary thereto, our invention has as its object to effect, within a steam power installation, the cleaning of the feed water for the purpose of removing iron oxides, by employing an electromagnetic filter which guarantees a reliable precipitation of the iron oxides while also making possible the rinsing away of the removed particles.

The invention uses a filter comprises of a cylindrical-tubular filter container with spheres of ferromagnetic material and an electric coil for the production of a magnetic field. The particles to be magnetized are of steel. The coil for producing the magnetic field is charged with such current that the produced field force is considerably above the saturation field force for the magnetizable particles. When the magnetic field is applied, field force gradients occur in the spaces between the arbitrarily arranged spheres, at places where the contact axis of the spheres has a vector in the applied field direction. At these places, a field force density will occur.

It is preferable when the electromagnetic filter is so installed into a parallel branch to the feed-water tank of the steam power installation, that the inlet line to the filter comes from a chamber of the feed-water container which is divided by a perpendicular overflow baffle, while the outlet line of the filter ends in the other chamber. It is also possible to install a filter between the pre-pump and the main pump of each feed-water pump. Another embodiment is to install the magnetic filter directly into the feed-water stream between the high-pressure preheating outlet and the boiler inlet. This requires, however, that the filter be designed for the full operational pressure of the boiler feed pumps.

The ferromagnetic particles can consist also of steel cuttings or pins. The use of steel spheres with the same or variable diameter, however, is most preferred. Furthermore, the ferromagnetic particles can be coated with a rust protective layer. The filter container itself is of non-magnetic material.

The coil which produces the magnetic field can concentrically enclose the filter container or can be arranged within the filter container. When arranged within the filter, the coil can be divided into several ring coils positioned near the wall of the filter container or it can be installed, as one or several rod coils, in parallel to the axis of the filter container, inside the latter. Moreover, it is preferable that the winding of the coils consists of copper or aluminum tubes since these can easily be cooled during the required high stresses.

Once the filter is saturated and the particles rinsed out of the filter bed, it is, first of all, preferable to demagnetize the ferromagnetic particles. This is best effected with an alternating current of 50 or 60 Hz or with a broken up direct current of about 0.5 Hz.

The flow rate of the feed water through the filter bed can be adjusted to approximately 10 to 50 cm/sec.

When the precipitated particles are rinsed away from the filter bed, a rinsing liquid is usually introduced from below at such speed that the magnetic particles are fluidized. This fluidization or whirling up makes it easier to loosen the adhering particles. It is also favorable to use in addition a gas for rinsing purposes.

Figure 2:
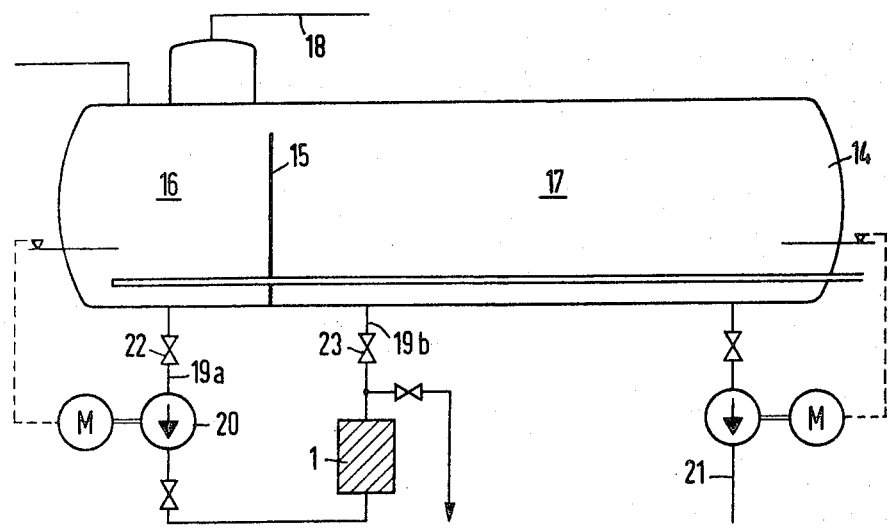
Figure 3:
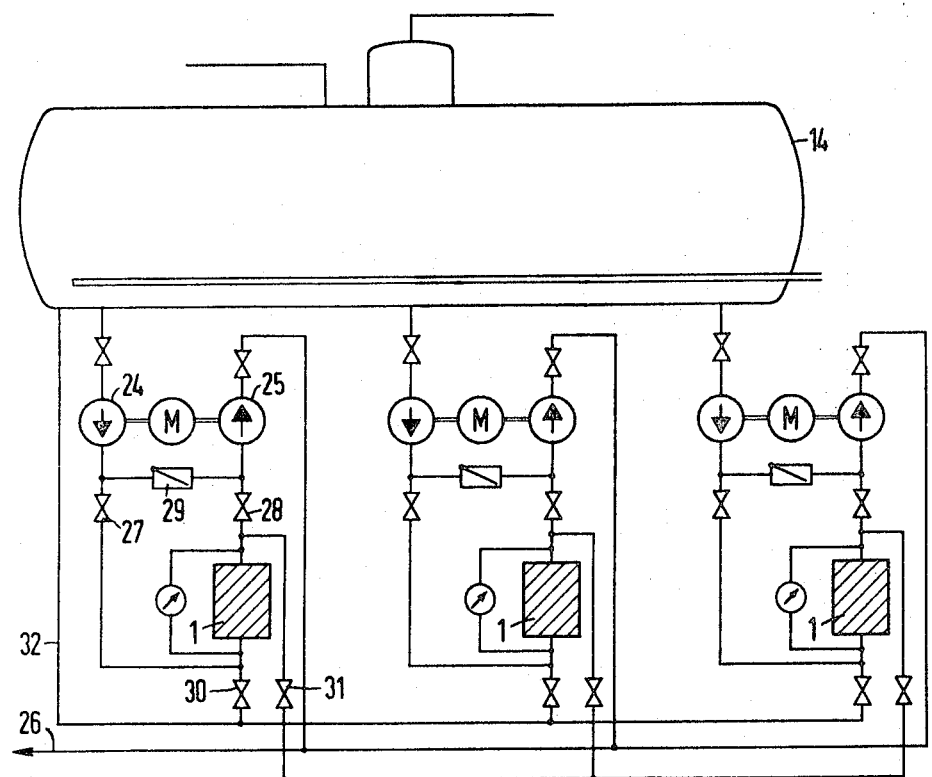

The drawing schematically shows the filter and the mode of operation according to the invention, wherein:

FIG. 1 is a section of an electromagnetic filter;
FIG. 2 shows the installation of the filter in parallel to the feed-water storage container; and
FIG. 3 shows the installation of the filter between the prepump and the main pump.

In FIG. 1, the filter comprises a cylindrical filter container 1 which has an inlet nozzle 2 and an outlet nozzle 3, respectively, at the lower and upper end of the filter. Within the filter container are arranged the filling members 4, which are supported from below, by the bottom sieve 5, while a top sieve or screen 6 is situated in the upper portion to prevent the entrainment and carrying along of magnetizable particles. The filter container 1 is surrounded, according to the illustrated examples, by a cylindrical coil 7. The coil can also be divided into a plurality of individual disc coils, arranged in series. The lower inlet nozzle 2 also has a lateral inlet 8 for the rinsing gas, while the upper nozzle 3 contains a lateral rinse water outlet 9. During normal operation, the valves 10 and 11 in the main supply line are open, while valves 12 and 13 in the rinse line are closed. Thus, it is possible for the filter to be flooded from below upwardly as well as from above downwardly. After the filter bed is saturated, which can usually be recognized from the increased pressure drop, the upper valve 11 is closed, while valve 12 and 13 are opened. A rinsing water stream is now passed from below through the filter bed at such a velocity that it causes the magnetizable particles to be fluidized in the filter container so that the deposited particles can be rinsed away with greater ease. A considerable increase in the rinsing process can be obtained by introducing, through line 8, an additional rinsing gas.

It is advantageous to apply before and during the rinsing process a decaying alternating current to the coil or a broken direct current of 0.5 Hz, in order to demagnetize the steel spheres. When a broken direct current is used for demagnetizing, it must be symmetrical with respect to a coil pole so that both branches of the hysteresis loop are passed.

It is further possible to arrange the coil within the filter container 1. It can be constructed as a ring coil adjacent the wall region of the container or can also be arranged in form of rod coils, parallel to the axis of the filter container.

FIG. 2 illustrates the installation of such a filter into the feed-water cycle. It is fundamentally preferable to arrange the filter behind the feed-water container. According to the illustrated embodiment example, the feed-water container 14 has a perpendicularly arranged overflow sheet 15 which divides the container into two chambers 16 and 17. The condensate which flows via the supply line 18 into the first chamber 16 is then pumped via a line 19a and a rotating pump 20, into the filter container 1 and flows, therefrom, into the second chamber 17. The cleaned boiler feed water flows to the boiler, via line 21.

When the magnetic filter fails or is being back rinsed, the condensate can flow, after valves 23 and 22 are closed in the inlet and outlet of the magnetic filter 1, across overflow sheet 15, directly into chamber 17 and therefrom to the boiler.

According to the embodiment of FIG. 3, one electromagnetic filter 1 each is installed between the prepump 24 and the main pump 25 of each boiler feed pump. The purified water then flows via the collecting line 26 to the boiler. During a disturbance or a flush cleaning of the filter, valves 27 and 28 can be closed, so that the boiler feed water can flow directly to the main pump 25, via a restoring flap 29. For rinsing purposes, valve 30 and drainage valve 31 can be opened, so that the filter is provided with rinsing water via line 32, directly from the feed-water container 15. The rinsing liquid with the precipitated particles is then expelled, via line 33.

It is possible also to install the magnet filter directly into the feed-water stream between a high-pressure preheating outlet and the boiler entrance. Though the best effect can be obtained with this arrangement, the filter must then be designed for the full operational pressure of the boiler feed pump.

The described device and its appropriate arrangement in the feed-water cycle makes it possible to obtain, in a simple manner, a reliable removal of iron oxides. This installation affords a particularly easy cleaning of the filter bed without replacing the filter material. The extremely high field intensities which lie much above the saturation field intensity of the magnetizable particles make it possible to reliably precipitate all ferromagnetic particles in the feed water upon the steel spheres. The demagnetizing furthermore ensures a good opportunity for removing the adhering particles away from the steel spheres.

Such an installation can be used for cleaning the feed water of all conventional steam power plants, such as industrial power plants, condensation power plants as well as nuclear power plants. The installation of such filters is particularly important here since this helps also to catch radioactive particles in the primary cycle. Beyond this, the installation can be used wherever one desires to remove finely distributed magnetic iron oxides from a liquid.

What is claimed is:

1. Device for cleansing the feed water of boilers from iron oxides, which comprises an electromagnetic filter comprising a cylindrical filter container, containing a filter bed of magnetizable particles and a coil for producing a magnetic field surrounding the filter bed, the magnetizable particles consisting of steel balls and the field intensity produced by the coil is considerably above the saturation field intensity of the steel balls, decaying alternating current means for regeneration and rinsing of the filter by effecting demagnetization of the steel balls, means for introducing rinse water from below upward at such speed through the filter container that the steel balls are whirled up, said filter container being connected in parallel with a feed-water container, an inlet to the filter container from a first chamber of the feed-water container and an outlet of the filter container feeding into a second chamber, said chambers of the container being separated by a wall which separates the container only in the lower portion thereof, and a pump connected in series with said electromagnetic filter, said pump being operated in dependence on the liquid level, in one part of said container.

* * * * *